US 8,152,489 B2

(12) United States Patent
Shimizu et al.

(10) Patent No.: US 8,152,489 B2
(45) Date of Patent: Apr. 10, 2012

(54) MOTOR-DRIVEN SUPERCHARGER

(75) Inventors: Masahiro Shimizu, Tokyo (JP);
Yasuyuki Shibui, Tokyo (JP)

(73) Assignee: IHI Corporation, Tokyo (JP)

( * ) Notice: Subject to any disclaimer, the term of this patent is extended or adjusted under 35 U.S.C. 154(b) by 471 days.

(21) Appl. No.: 12/377,977

(22) PCT Filed: Jul. 4, 2007

(86) PCT No.: PCT/JP2007/063356
§ 371 (c)(1),
(2), (4) Date: Feb. 18, 2009

(87) PCT Pub. No.: WO2008/020512
PCT Pub. Date: Feb. 21, 2008

(65) Prior Publication Data
US 2010/0247342 A1    Sep. 30, 2010

(30) Foreign Application Priority Data
Aug. 18, 2006 (JP) ................................ 2006-223055

(51) Int. Cl.
*F04B 35/00* (2006.01)
(52) U.S. Cl. ........................................................ 417/405
(58) Field of Classification Search ............ 417/405–407
See application file for complete search history.

(56) References Cited

U.S. PATENT DOCUMENTS

| | | | |
|---|---|---|---|
| 2,588,459 A | 3/1952 | Annen | |
| 2,918,207 A | 12/1959 | Moore | |
| 3,612,628 A | 10/1971 | Steele | |
| 3,632,222 A | 1/1972 | Cronstedt | |
| 3,675,056 A | 7/1972 | Lenz | |
| 3,728,857 A | 4/1973 | Nichols | |
| 3,742,123 A | 6/1973 | Haub, Jr. | |
| 3,778,194 A | 12/1973 | Miller et al. | |
| 3,811,741 A | 5/1974 | McInerney et al. | |

(Continued)

FOREIGN PATENT DOCUMENTS

CA    2068369    11/1992

(Continued)

OTHER PUBLICATIONS

International Search Report issued in corresponding application No. PCT/JP2007/063356, completed Jul. 26, 2007 and mailed Aug. 7, 2007.

(Continued)

*Primary Examiner* — Toan Ton
*Assistant Examiner* — Hana Featherly
(74) *Attorney, Agent, or Firm* — Griffin & Szipl, P.C.

(57) ABSTRACT

A motor-driven supercharger is provided with a stator assembly inserted and attached to a bearing housing, and a seal plate closely attached to a compressor side of the stator assembly and comparting between a compressor housing and a motor stator (24). The stator assembly has the motor stator and an outer sleeve having an inner peripheral surface closely attached to an outer peripheral surface of the motor stator and supporting the motor stator in such a manner as to constrain a rotation of the motor stator, wherein the motor stator and the outer sleeve form an integral part so as to construct the stator assembly, and the outer sleeve constructs a liquid tight water cooling jacket between the outer sleeve and the bearing housing. The outer sleeve and the seal plate are fastened together in an axial direction between the bearing housing and the compressor housing.

11 Claims, 7 Drawing Sheets

U.S. PATENT DOCUMENTS

| | | | |
|---|---|---|---|
| 3,890,780 A | 6/1975 | Hagemeister et al. | |
| 3,927,530 A | 12/1975 | Braun | |
| 3,961,867 A | 6/1976 | Woollenweber | |
| 4,061,279 A | 12/1977 | Sautter | |
| 4,198,063 A | 4/1980 | Shimizu et al. | |
| 4,253,031 A | 2/1981 | Frister | |
| 4,301,375 A | 11/1981 | Anderson | |
| 4,641,977 A | 2/1987 | Woollenweber | |
| 4,704,075 A | 11/1987 | Johnston et al. | |
| 4,745,755 A | 5/1988 | Kawamura | |
| 4,757,686 A | 7/1988 | Kawamura et al. | |
| 4,833,887 A | 5/1989 | Kawamura et al. | |
| 4,872,817 A | 10/1989 | DeKruif | |
| 4,883,370 A | 11/1989 | Nakanishi | |
| 5,121,605 A | 6/1992 | Oda et al. | |
| 5,243,880 A | 9/1993 | Beier et al. | |
| 5,323,613 A | 6/1994 | Akiyama | |
| 5,587,332 A | 12/1996 | Chang et al. | |
| 5,605,045 A | 2/1997 | Halimi et al. | |
| 5,798,587 A | 8/1998 | Lee | |
| 5,834,117 A | 11/1998 | Onishi | |
| 5,857,332 A | 1/1999 | Johnston et al. | |
| 5,870,894 A | 2/1999 | Woollenweber et al. | |
| 5,904,471 A | 5/1999 | Woollenweber et al. | |
| 5,906,098 A | 5/1999 | Woollenweber et al. | |
| 6,032,466 A | 3/2000 | Woollenweber et al. | |
| 6,102,672 A | 8/2000 | Woollenweber et al. | |
| 6,129,524 A | 10/2000 | Woollenweber et al. | |
| 6,145,314 A | 11/2000 | Woollenweber et al. | |
| 6,160,332 A | 12/2000 | Tsuruhara | |
| 6,218,747 B1 | 4/2001 | Tsuruhara | |
| 6,253,747 B1 | 7/2001 | Sell et al. | |
| 6,257,834 B1 | 7/2001 | Bremer et al. | |
| 6,278,199 B1 | 8/2001 | Grant et al. | |
| 6,293,769 B1 | 9/2001 | Radermacher et al. | |
| 6,416,281 B1 | 7/2002 | Bremer et al. | |
| 6,449,950 B1 | 9/2002 | Allen et al. | |
| 6,609,375 B2 | 8/2003 | Allen et al. | |
| 6,647,724 B1 | 11/2003 | Arnold et al. | |
| 6,668,553 B1 | 12/2003 | Ghizawi | |
| 6,753,628 B1 | 6/2004 | Neal | |
| 6,768,332 B2 | 7/2004 | Lin et al. | |
| 6,845,617 B1 | 1/2005 | Allen et al. | |
| 6,871,499 B1 | 3/2005 | Allen et al. | |
| 6,986,648 B2 | 1/2006 | Williams et al. | |
| 7,008,194 B2 | 3/2006 | Frankenstein | |
| 7,010,916 B2 | 3/2006 | Sumser et al. | |
| 7,056,103 B2 | 6/2006 | LaRue | |
| 7,352,077 B2 | 4/2008 | Shibui et al. | |
| 7,360,361 B2 | 4/2008 | Prusinski et al. | |
| 7,458,214 B2 | 12/2008 | Philippe | |
| 7,670,056 B2 | 3/2010 | Petitjean et al. | |
| 7,753,591 B2 | 7/2010 | Petitjean et al. | |
| 7,765,846 B2 | 8/2010 | Stueckrad et al. | |
| 2003/0017879 A1 | 1/2003 | Tsay et al. | |
| 2003/0051475 A1 | 3/2003 | Allen et al. | |
| 2003/0118461 A1 | 6/2003 | Hodapp et al. | |
| 2004/0229703 A1 | 11/2004 | Jackson et al. | |
| 2005/0082941 A1 | 4/2005 | Iida et al. | |
| 2006/0081226 A1 | 4/2006 | Bolz | |
| 2006/0123783 A1 | 6/2006 | Philippe | |
| 2006/0225419 A1 | 10/2006 | Prusinski et al. | |
| 2006/0245913 A1 | 11/2006 | Thiele et al. | |
| 2007/0036664 A1 | 2/2007 | Shibui et al. | |
| 2007/0108772 A1* | 5/2007 | Shibui et al. ................ 290/52 |
| 2008/0087018 A1 | 4/2008 | Woollenweber | |
| 2009/0025386 A1 | 1/2009 | Rumsby | |
| 2010/0132358 A1 | 6/2010 | Purdey et al. | |
| 2010/0175377 A1 | 7/2010 | Hippen et al. | |
| 2010/0266430 A1 | 10/2010 | Shimizu | |
| 2011/0124421 A1 | 5/2011 | Kienhofer et al. | |

FOREIGN PATENT DOCUMENTS

| | | |
|---|---|---|
| CH | 266731 | 2/1950 |
| CN | 2605696 Y | 3/2004 |
| DE | 4115273 | 6/1992 |
| DE | 10156704 | 5/2003 |
| DE | 10022113 | 11/2005 |
| DE | 10 2005 052 363 | 5/2007 |
| EP | 0079100 | 5/1983 |
| EP | 0212988 | 3/1987 |
| EP | 0304259 | 2/1989 |
| EP | 1348848 | 10/2003 |
| FR | 2859499 | 3/2005 |
| GB | 2021874 | 12/1979 |
| GB | 2162377 | 1/1986 |
| JP | 58-124024 | 7/1983 |
| JP | 60-153826 | 10/1985 |
| JP | 61-49126 | 4/1986 |
| JP | 61-237830 A | 10/1986 |
| JP | 01-019122 | 1/1989 |
| JP | 01-171006 | 7/1989 |
| JP | 02-099722 | 4/1990 |
| JP | 03-138430 | 6/1991 |
| JP | 4-119624 | 10/1992 |
| JP | H05026202 | 4/1993 |
| JP | 05199708 | 8/1993 |
| JP | 06-042361 | 2/1994 |
| JP | 06-288242 | 10/1994 |
| JP | 06-346748 | 12/1994 |
| JP | 07-102988 | 4/1995 |
| JP | 10-299500 | 11/1998 |
| JP | 11-182259 | 7/1999 |
| JP | 2000-110577 | 4/2000 |
| JP | 2000-130176 | 5/2000 |
| JP | 2000-145468 | 5/2000 |
| JP | 2000145468 A | 5/2000 |
| JP | 2000-514987 | 11/2000 |
| JP | 2001-295655 | 10/2001 |
| JP | 2001-527613 | 12/2001 |
| JP | 3389748 | 3/2003 |
| JP | 2003-232340 | 8/2003 |
| JP | 2003232340 A | 8/2003 |
| JP | 2003-293785 | 10/2003 |
| JP | 2004-003420 | 1/2004 |
| JP | 2004-044451 | 2/2004 |
| JP | 2004-044452 | 2/2004 |
| JP | 2004-144094 | 5/2004 |
| JP | 10 2004 0089337 | 10/2004 |
| JP | 2005-023920 | 1/2005 |
| JP | 2005-069178 | 3/2005 |
| JP | 2005-120927 | 5/2005 |
| JP | 2005-207337 | 8/2005 |
| JP | 2005207337 A | 8/2005 |
| JP | 2005-248799 | 9/2005 |
| JP | 2005248799 A | 9/2005 |
| JP | 2006-002568 | 1/2006 |
| JP | 2006-514526 | 4/2006 |
| JP | 2007-297973 A | 11/2007 |
| JP | 2007-309101 | 11/2007 |
| JP | 2007-321698 A | 12/2007 |
| JP | 2007-321699 A | 12/2007 |
| JP | 2008-029166 | 2/2008 |
| JP | 2008-31949 A | 2/2008 |
| JP | 2009-243361 A | 10/2009 |
| JP | 2009-243365 A | 10/2009 |
| JP | 2010-121589 A | 6/2010 |
| KR | 10 2004 0105849 A | 12/2004 |
| WO | 84/04136 | 10/1984 |
| WO | 98-02652 | 1/1998 |
| WO | 98/30790 | 7/1998 |
| WO | 2005/024202 A1 | 3/2005 |
| WO | 2005/028876 A1 | 3/2005 |
| WO | 2005/113961 A1 | 12/2005 |

OTHER PUBLICATIONS

First Office Action, issued in corresponding Chinese Patent Application No. 200780020456.2, issued Nov. 20, 2009.

Office Action issued in co-pending U.S. Appl. No. 12/300,726, dated Dec. 21, 2010.

Office Action issued in Japanese Patent Application No. 2006-207973, of co-pending U.S. Appl. No. 12/864,837, dated Jan. 11, 2011 with an english translation.

http://answers.yahoo.com/question/index?qid=20100220052035A, dated Feb. 20, 2010, downloaded Mar. 9, 2011, 1 page.

http://www.answers.com/topic/friction-fit, downloaded Mar. 9, 2011, 1 page.
http://www.roymech.co.uk/Useful_Tables/ISO_Tolerances/ISO, downloaded Mar. 9, 2011, 2 pgs.
http://encyclopedia2.thefreedictionary.com/friction+fit, downloaded Mar. 9, 2011, 2 pgs.
Office Action issued in co-pending U.S. Appl. No. 12/300,746, dated Dec. 22, 2010.
Microfilm of the specification and drawings annexed to the request of Japanese Utility Model Application No. 10710/1983 (Laid-open No. 116537/1984), Toyota Motor Corp, Aug. 6, 1984.
Microfilm of the specification and drawings annexed to the request of Japanese Utility Model Application No. 142414/1985 ( Laid-open No. 49629/1987), Nissan Motor Corp, Mar. 27, 1987.
Microfilm of the specification and drawings annexed to the request of Japanese Utility Model Application No. 115203/1986 (Laid-open No. 22301/1988), Nissan Motor Corp, Feb. 15, 1988.
Microfilm of the specification and drawings annexed to the request of Japanese Utility Model Application No. 134167/1984 (Laid-open No. 49126/1986), dated Apr. 2, 1986.
Office Action issued in related Korean Patent Application No. 10-2007-0005555 (included herein in Korean and Japanese) dated Mar. 30, 2009.
Office Action issued in co-pending U.S. Appl. No. 11/617,211 mailed Feb. 22, 2010.
Chinese Office Action issued in co-pending U.S. Appl. No. 12/377,987. Chinese Application No. 200780030544.0. mailed Mar. 8, 2010.
Office Action issued in Korean Patent Application No. 10-2008-7028778, dated Feb. 28, 2011, of co-pending U.S. Appl. No. 12/300,726 and its english translation.
Office Action issued in co-pending U.S. Appl. No. 12/300,726, dated May 2, 2011.
Notice of Allowance issued in co-pending U.S. Appl. No. 12/300,746, dated Apr. 19, 2011.
http://encyclopedia2.thefreedictionary.com/friction+fit,downloaded Mar. 9, 2011, 2 pages.
Office Action mailed Aug. 23, 2011 in co-pending U.S. Appl. No. 12/280,816.
Office Action mailed Jul. 12, 2011 in co-pending U.S. Appl. No. 12/377,987.
Patent Abstracts of Japan English Abstract corresponding to the Hattori Document JP61-237830.
Espacenet English Abstract corresponding to the Hwang Document KR20040089337.
Machine English Translation of the Hwang Document KR20040089337, obtained from the Korean Patent Office.
Machine translation of JP2000-145468.
Office Action issued Oct. 11, 2011 in related Korean Patent Application No. 10-2009-7002939 and its English translation.
Office Action issued Oct. 11, 2011 in related Korean Patent Application No. 10-2009-7002938 and its English translation.
Office Action issued Nov. 1, 2011 in related Korean Patent Application No. 10-2009-7021399 and its English translation.

* cited by examiner

MOTOR-DRIVEN SUPERCHARGER

BACKGROUND OF THE INVENTION

1. Field of the Invention

The present invention relates to a motor-driven supercharger having an electric motor built-in.

2. Description of the Related Art

To supply an air having a density increased by a compressor to an engine is called supercharging, and a structure providing for a driving work of the compressor on the basis of an exhaust energy is called as an exhaust-gas turbocharger.

The exhaust-gas turbocharger is generally constituted by a compressor and a turbine which are arranged so as to sandwich a bearing unit therebetween. The compressor has a compressor impeller built-in, and the turbine has a turbine impeller built-in, respectively. The compressor impeller and the turbine impeller are coupled to each other by a connecting shaft (a shaft) supported by a bearing unit, and are structured such as to rotationally drive the turbine impeller on the basis of an exhaust gas of the engine, transmit the rotating force to the compressor impeller via the connecting shaft, and compress the air by the compressor impeller so as to supercharge to the engine.

In the exhaust turbine supercharger mentioned above, there has been already proposed a structure having an electric motor built-in for assisting an acceleration at a time of rotating at a low speed (for example, patent documents 1, 2 and 3). Hereinafter, the exhaust-gas turbocharger having the electric motor built-in mentioned above is simply called as "motor-driven supercharger".

The motor-driven supercharger in the patent document 1 is provided with an electric motor (a stator 51 and a rotor 52) rotationally driving a rotor. The rotor is constituted by a turbine impeller 53, a compressor impeller 54, a shaft 55 coupling them and a spacer collar 56 to which the rotor 52 of the electric motor is attached. The shaft 55 is supported by a single semi-floating bearing 57. The semi-floating bearing 57 has a hub 53*a* of the turbine 53 and thrust surfaces 57*a* and 57*b* engaging with the spacer collar 56.

In accordance with this structure, a thrust force applied to the rotor is supported by the hub 53*a* of the turbine of the semi-floating bearing 57 and the thrust surfaces 57*a* and 57*b* engaging with the spacer collar 56.

The motor-driven supercharger in the patent document 2 has a rotor 62 supported by an extension portion in an axial direction of a compressor wheel 61, and a stator 64 supported by a housing 63 so as to be spaced to an outer side in a radial direction from the rotor 62, as shown in FIG. 2.

The motor-driven supercharger in the patent document 3 has the following structure as shown in FIG. 3. A shaft 74 in which a compressor wheel 75 is coupled to one end is rotatably supported in an inner portion of a center housing 71. A compressor housing 72 and a turbine housing 73 are coupled to both sides of the center housing 71 by bolts 82 and 83. An electric motor cartridge 76 is fixed to an inner portion of the center housing 71. The electric motor cartridge 76 is constituted by a first cartridge housing portion 78, a second cartridge housing portion 79, a rotor 79 and a stator 80. The electric motor cartridge 76 can be produced independently from a step of installing to the motor-driven supercharger. The electric motor cartridge 76 is fixed to the center housing 71 by a cartridge screw 81. Further, a water cooling jacket 71*a* is formed in a portion surrounding the electric motor cartridge 76 in an inner portion of the center housing 71.

Patent Document 1: U.S. Pat. No. 6,449,950
Patent Document 2: U.S. Pat. No. 6,032,466
Patent Document 3: Japanese Unexamined Patent Publication Translated Version No. 2006-514526

In the motor-driven supercharger, since the compressor impeller and the turbine impeller coupled by the shaft is rotatably driven by the built-in electric motor, it is necessary to firmly fix the stator (the motor stator) of the electric motor receiving a reaction force to the casing.

However, in the case that the stator 51 is gripped by two electric motor casings 58*a* and 58*b* from both sides in an axial direction such as the motor-driven supercharger in the patent document 1, the additional casings 58*a* and 58*b* are necessary in comparison with the conventional supercharger which does not have the electric motor built-in. Further, since the compressor impeller is close to the stator of the electric motor, there is a problem that it is hard to cool both the compressor impeller and the electric motor.

In the same manner, in the motor-driven supercharger in the patent document 2, in order to have the stator 64 of the electric motor built-in, an exclusive fixing part such as a clamping bracket 65 fixing the additional casing 63 and the stator 64 is necessary. Further, in this embodiment, since the water cooling jacket 66 is provided within a wall portion of the casing 63, the structure of the casing 63 becomes complicated.

In the motor-driven supercharger in the patent document 3, any structure corresponding to the additional casing is not provided, and the structure is made such that the electric motor cartridge 76 is installed as an integral part to the center housing 71. However, in order to fix the electric motor cartridge 76 to the center housing 71, it is necessary to use an exclusive fixing part such as a cartridge screw 81. Further, since the water cooling jacket 71*a* is provided within a wall portion of the center housing 71, it is necessary to form the water cooling jacket 71*a* of the center housing 71 by a casting or the like, and a structure thereof becomes complicated. Further, since the structure is made such as to cool the electric motor cartridge 76 via a wall portion of the center housing 71 in place of directly cooling the electric motor cartridge 76 by the water cooling jacket 71*a*, a cooling efficiency is not good.

SUMMARY OF THE INVENTION

The present invention is made for solving the problem mentioned above. In other words, an object of the present invention is to provide a motor-driven supercharger which can firmly fix a stator (a motor stator) of an electric motor to a casing without necessity of any additional casing and any exclusive fixing part, and can efficiently cool both of a compressor impeller and the electric motor, in comparison with a conventional supercharger which does not have any electric motor built-in.

In accordance with the present invention, there is provided a motor-driven supercharger comprising:
a turbine shaft having a turbine impeller in one end;
a compressor impeller rotationally driven by the turbine shaft;
a bearing housing rotatably supporting the turbine shaft;
a compressor housing rotatably surrounding the compressor impeller and coupled to the bearing housing;
a motor stator fixed within the bearing housing; and
a motor rotor rotationally driven by the motor stator,
wherein the motor-driven supercharger is provided with a stator assembly inserted and attached to the bearing housing, and a seal plate closely attached to a compressor side of the stator assembly and comparting between the compressor housing and the motor stator, the stator assembly has the motor stator and an outer sleeve having an inner peripheral surface closely attached to an outer peripheral surface of the motor stator and supporting the motor stator in such a manner as to constrain a rotation of the motor stator, the motor stator and the outer sleeve form an integral part so as to construct the stator assembly, the outer sleeve constructs a liquid tight water cooling jacket between the outer sleeve and the bearing housing, and the outer sleeve and the seal plate are fastened together in an axial direction between the bearing housing and the compressor housing.

In accordance with a preferable aspect of the present invention, the outer sleeve has a flange portion fastened together with the seal plate and extending to an outer side in a radial direction between the bearing housing and the compressor housing.

Further, in accordance with the present invention, there is provided a motor-driven supercharger comprising:

a turbine shaft having a turbine impeller in one end;

a compressor impeller rotationally driven by the turbine shaft;

a bearing housing rotatably supporting the turbine shaft;

a compressor housing rotatably surrounding the compressor impeller and coupled to the bearing housing;

a motor stator fixed within the bearing housing; and a motor rotor rotationally driven by the motor stator, wherein the motor-driven supercharger is provided with a stator assembly inserted and attached to the bearing housing, the stator assembly has the motor stator and an outer sleeve having an inner peripheral surface closely attached to an outer peripheral surface of the motor stator and supporting the motor stator in such a manner as to constrain a rotation of the motor stator, the motor stator and the outer sleeve form an integral part so as to construct the stator assembly, a wall surface in the compressor side in the stator assembly forms a passage of a compressor discharge air, and the outer sleeve is fastened together in an axial direction between the bearing housing and the compressor housing, and constructs a liquid tight water cooling jacket between the outer sleeve and the bearing housing.

In accordance with a preferable aspect of the present invention, the outer sleeve has a flange portion fastened together and extending to an outer side in a radial direction between the bearing housing and the compressor housing.

Further, it is preferable to have a seal member sealing in a liquid tight manner between the bearing housing and the outer sleeve and arranged so as to be spaced in an axial direction.

In accordance with the structure on the basis of the present invention mentioned above, since the outer sleeve and the motor stator construct the stator assembly as the integral part, and the outer sleeve of the stator assembly and seal plate are fastened together in the axial direction between the bearing housing ad the compressor housing, it is possible to simultaneously fix the motor stator to the bearing housing by fixing the compressor housing to the bearing housing. Accordingly, since the additional casing for fixing the motor stator 24 to the bearing housing 16 and the exclusive fixing part (the fastening device such as the bolt or the like) at a time of assembling are not necessary, and it is possible to reduce the number of the parts at a time of assembling, it is easy to assemble and disassemble.

Further, since the outer sleeve is closely attached to the outer peripheral surface of the motor stator and supports the motor stator so as to constrain the rotation of the motor stator, it is possible to firmly fix the stator (the motor stator) of the electric motor to the casing.

Further, since the stator assembly constructs the liquid tight water cooling jacket between the stator assembly and the bearing housing, the outer wall portion (the outer sleeve) of the stator assembly is directly cooled, whereby it is possible to efficiently cool the motor stator closely attached to the outer sleeve.

Further, since the seal plate comparts between the compressor housing and the motor stator, and is closely attached to the compressor side of the outer sleeve, it is possible to set a contact area therebetween sufficient wide, and it is possible to efficiently cool the seal plate heated by a compressed air on the basis of a heat transfer from the seal plate to the water cooling jacket.

Further, the same effect as mentioned above can be obtained by the structure in which the stator assembly and the seal plate are integrated.

DESCRIPTION OF PREFERRED EMBODIMENT

Figure 1:
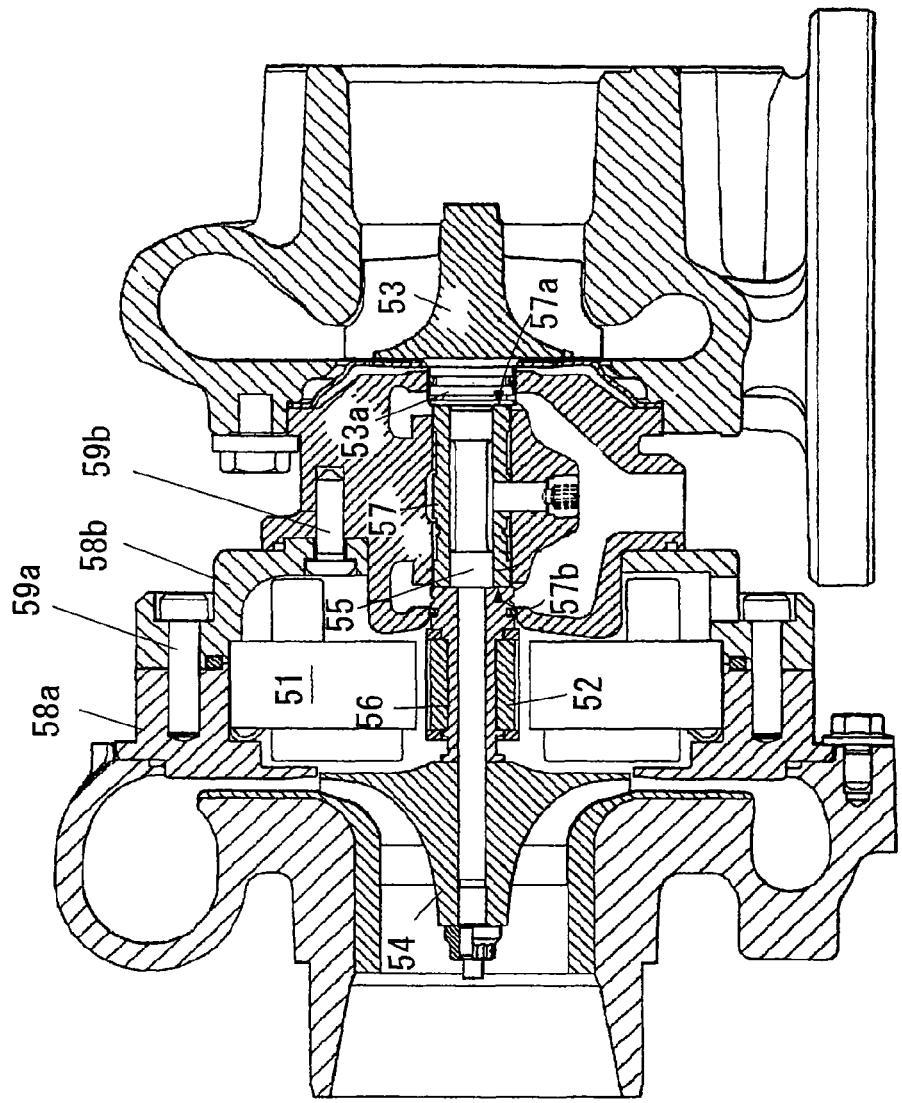
FIG. 1 is a schematic view of a motor-driven supercharger of patent document 1.
Figure 2:
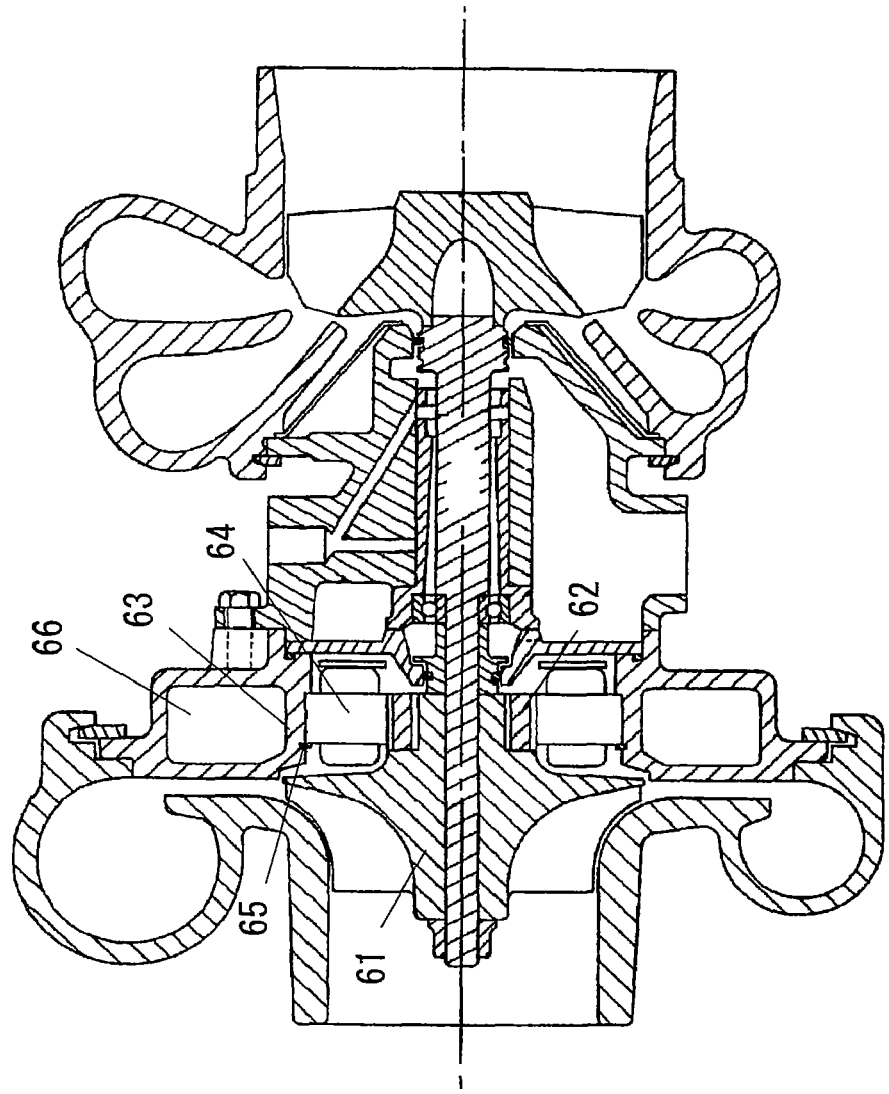
FIG. 2 is a schematic view of a motor-driven supercharger of patent document 2.
Figure 3:
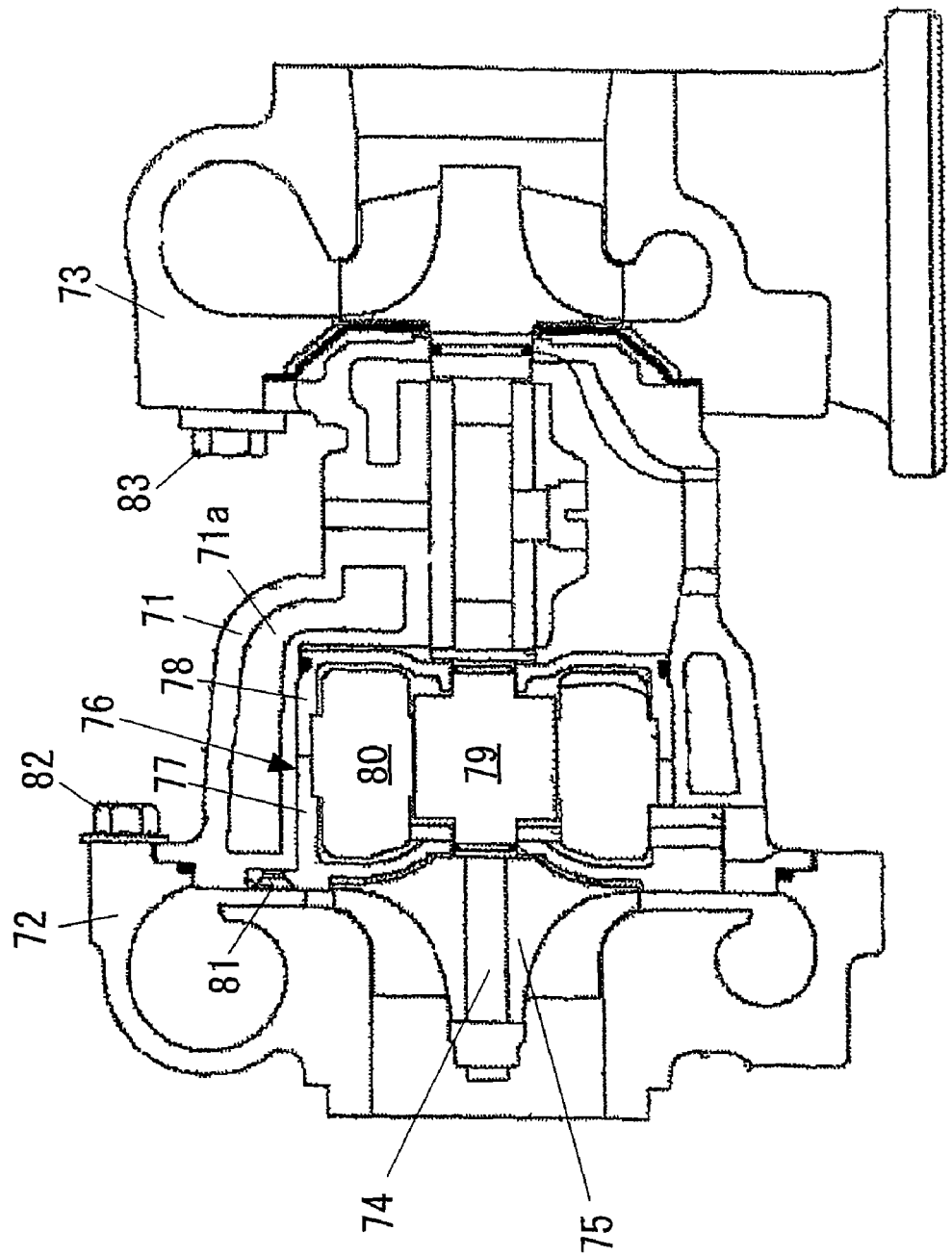
FIG. 3 is a schematic view of a motor-driven supercharger of patent document 3.

A description will be in detail given below of preferable embodiments in accordance with the present invention with reference to the accompanying drawings. In this case, in each of the drawings, the same reference numerals are attached to the common portions, and an overlapping description will be omitted.

Figure 4:
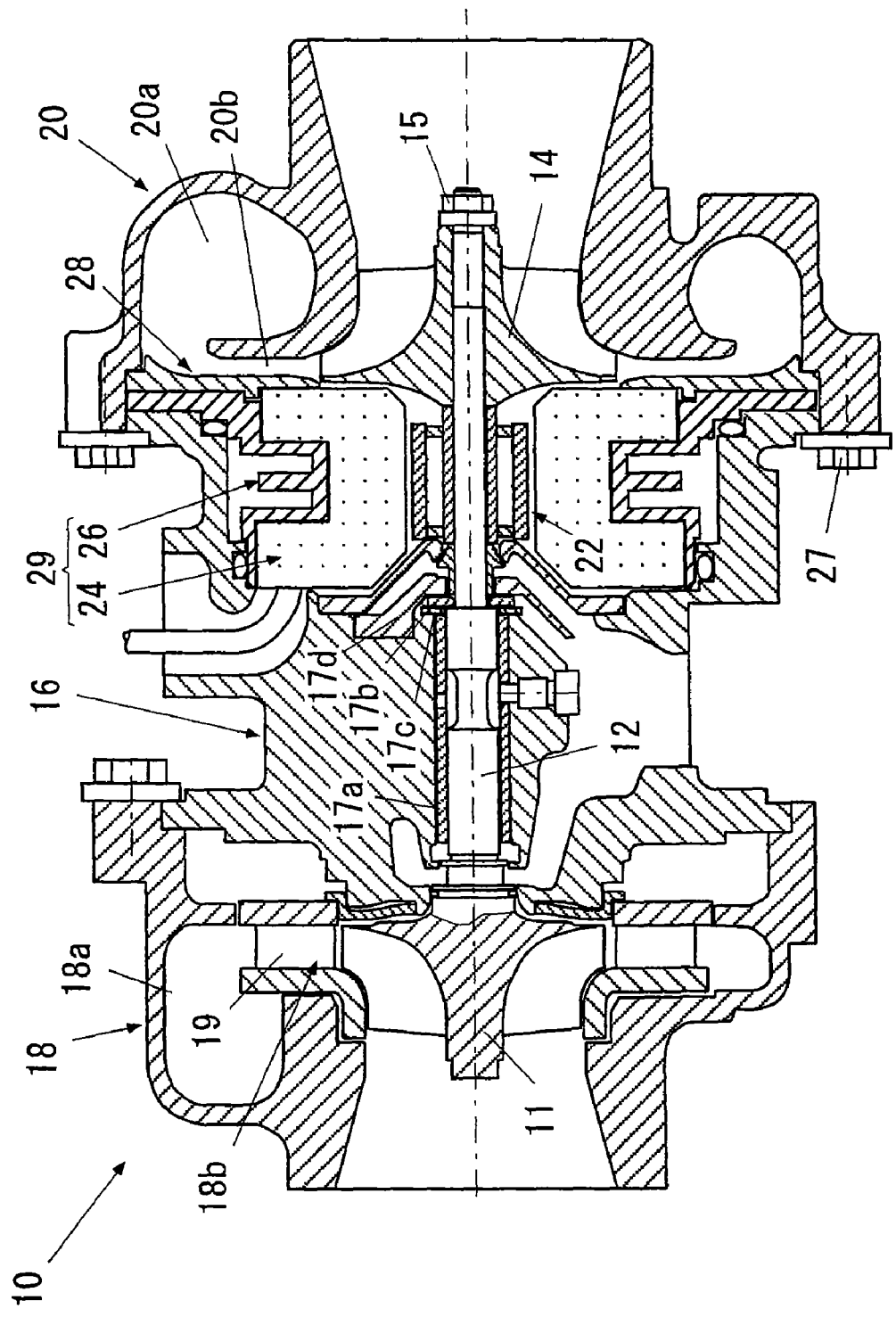
FIG. 4 is a schematic view of a whole of a motor-driven supercharger in accordance with a first embodiment of the present invention.

FIG. 4 is a schematic view of a whole of a motor-driven supercharger in accordance with a first embodiment of the present invention. In this drawing, a motor-driven supercharger 10 in accordance with the present invention is provided with a turbine shaft 12, a compressor impeller 14, and a housing. The housing is constituted by a bearing housing 16, a turbine housing 18 and a compressor housing 20 in this embodiment.

The turbine shaft 12 has a turbine impeller 11 in one end (a left end in the drawing). In this embodiment, the turbine impeller 11 is integrally formed in the turbine shaft 12, however, the present invention is not limited to this, but may be structured such that the turbine impeller 11 is independently attached.

The compressor impeller 14 is coupled to the other end (a right end in the drawing) of the turbine shaft 12 by an end nut 15 so as to be integrally rotated.

The bearing housing 16 rotatably supports the turbine shaft 12 by a bearing metal 17a. Further, the turbine shaft 12 is supported by a thrust collar 17b and thrust bearings 17c and 17d so as to be prevented from moving in an axial direction. Further, the bearing housing 16 has a lubricating oil flow path (not shown) for lubricating the bearing metal 17a, the thrust collar 17b and the thrust bearings 17c and 17d.

The turbine housing 18 rotatably surrounds the turbine impeller 11, and is coupled to the bearing housing 16. The turbine housing 18 has, in an inner portion, a scroll chamber 18a in which an exhaust gas is introduced from an outer portion, and an annularly formed flow path 18b guiding an exhaust gas from the scroll chamber 18a to the turbine impeller 11.

Further, a plurality of nozzle vanes 19 are arranged in the flow path 18b at a fixed interval in a peripheral direction. The nozzle vane 19 is constituted by a variable nozzle vane, and it is preferable that the nozzle vane 19 can change a flow path area formed therebetween. However, the present invention is not limited to this, but the nozzle vane may be constituted by a fixed nozzle vane.

Further, it is possible to employ an embodiment in which the nozzle vane 19 is not provided in the flow path 18b.

The compressor housing 20 rotatably surrounds the compressor impeller 14 and is coupled to the bearing housing 16. The compressor housing 20 has a scroll chamber 20a in which a compressed air is introduced to an inner portion, and an annularly formed flow path 20b guiding a compressed air to the scroll chamber 20a from the compressor impeller 14.

In accordance with the structure mentioned above, it is possible to rotationally drive the turbine impeller 11 by the exhaust gas of the engine, it is possible to transmit the rotating force to the compressor impeller 14 via the turbine shaft 12, and it is possible to compress the air by the compressor impeller 14 so as to supercharge to the engine.

In FIG. 4, the motor-driven supercharger 10 in accordance with the present invention is further provided with a motor rotor 22, a stator assembly 29 and a seal plate 28.

The motor rotor 22 is constituted by a rotor of the electric motor. A hollow portion is provided in the motor rotor 22, the turbine shaft 12 is inserted to the hollow portion, and the motor rotor 22 and the turbine shaft 12 are integrally rotated.

The stator assembly 29 corresponds to a part which is inserted and attached to the bearing housing 16, and has a motor stator 24 and an outer sleeve 26 having an inner peripheral surface closely attached to an outer peripheral surface of the motor stator 24 and supporting the motor stator 24 so as to constrain a rotation of the motor stator 24. The motor stator 24 and the outer sleeve 26 form an integral part so as to construct a stator assembly 29.

The motor stator 24 corresponds to a stator of the electric motor. A brushless a.c. motor is structured by the motor rotor 22 and the motor stator 24. It is preferable that the a.c. motor can correspond to a high speed rotation (for example, at least 100 thousand to 200 thousand rpm) of the turbine shaft 12, and can a rotational driving at a time of accelerating and a regenerative operation at a time of decelerating. Further, it is preferable that a driving voltage of the a.c. motor is equal to or higher than a d.c. voltage (for example, 12 V) of a battery mounted on a vehicle.

The seal plate 28 corresponds to a disc-like member having an opening portion in the center, is closely attached to the compressor side of the stator assembly 29, and comparts between the compressor housing 20 and the motor stator 24. The flow path 20b mentioned above is formed between a wall portion in a front surface side of the seal plate 28, and a wall portion of the compressor housing 20 opposing to the wall portion of the seal plate 28.

Figure 5:
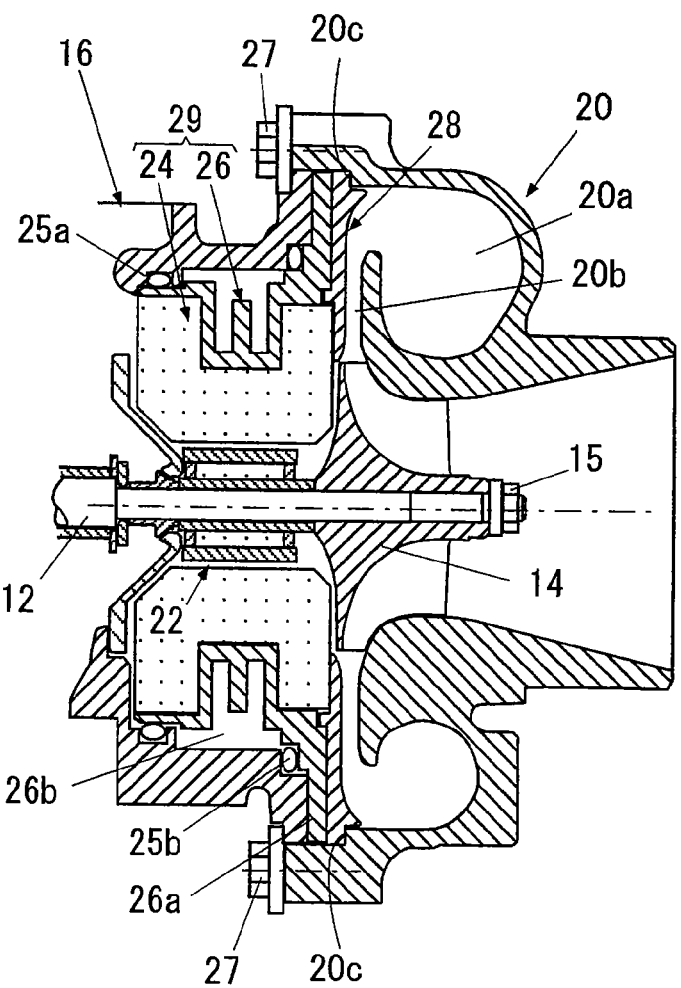
FIG. 5 is a partly enlarged view of FIG. 4.

FIG. 5 is a partly enlarged view of FIG. 4. As shown in FIGS. 4 and 5, the motor rotor 22 is fixed to the turbine shaft 12 or a side surface of the compressor impeller 14 in accordance with a mating.

The outer sleeve 26 has a flange portion 26a extending to an outer side in a radial direction, in an end portion in the compressor side.

Further, the motor-driven supercharger 10 in accordance with the present invention has seal members 25a and 25b sealing in a liquid tight manner between the bearing housing 16 and the outer sleeve 26 and arranged so as to be spaced in an axial direction. The seal member 25a is constituted by an O-ring sealing an outer peripheral surface of the bearing housing 16 in this embodiment, and the seal member 25b is constituted by an O-ring sealing an inner surface in an axial direction of the flange portion 26a in this embodiment. In this case, both of the seal members 25a and 25b may be constituted by an O-ring for an outer periphery or a surface, or may employ the other seals.

In accordance with this structure, a liquid tight water cooling jacket 26b is constructed between the bearing housing 16 and the outer sleeve 26. A cooling water for cooling the motor stator 24 is supplied to the water cooling jacket 26b from a cooling water supply port (not shown), and the cooling water is discharged from a cooling water discharge port (not shown).

The outer sleeve 26 and the seal plate 28 are fastened together in the axial direction between the bearing housing 16 and the compressor housing 20. In the present embodiment, the outer sleeve 26 and the seal plate 28 are sandwiched between an end surface in the compressor side of the bearing housing 16 and a step 20c formed in the compressor housing 20, and the bearing housing 16, the outer sleeve 26, the seal plate 28 and the compressor housing 20 are integrally and firmly fixed by coupling and fixing the bearing housing 16 and the compressor housing 20 by a bolt 27.

As mentioned above, the stator assembly 29 corresponds to a part in which the outer sleeve 26 and the motor stator 24 are integrated, and can be handled as a single part even before being attached to the bearing housing 16. In the present embodiment, even before being attached to the bearing housing 16, the outer sleeve 26 and the motor stator 24 are closely attached firmly, and a movement in the axial direction and a rotation of the motor stator 24 is constrained with respect to the outer sleeve 26. Accordingly, at the same time when the outer sleeve 26 is fastened together with the seal plate 28 in the axial direction between the bearing housing 16 and the compressor housing 20, the movement in the axial direction and the rotation of the motor stator 24 is constrained with respect to the bearing housing 16.

In this case, if the movement in the axial direction and the rotation of the motor stator 24 are constrained in the state of being fastened together in the axial direction between the bearing housing 16 and the compressor housing 20, some play may exist between the outer sleeve 26 and the motor stator 24, before being attached to the bearing housing 16.

Figure 6:
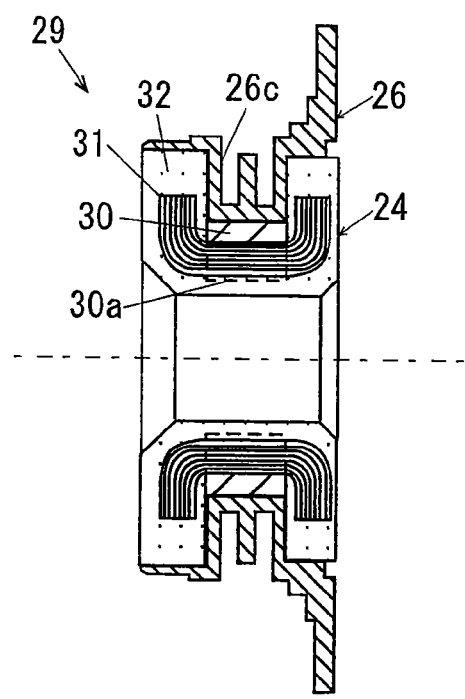
FIG. 6 is a cross sectional view showing a structure of a stator assembly.

Next, a description will be given in more detail of a structure of the stator assembly 29 in accordance with the present embodiment. FIG. 6 shows a cross sectional view of the stator assembly 29.

It is preferable that the outer sleeve 26 is constituted by a metal (for example, an aluminum or the like) having a good heat transfer rate. In the case that the outer sleeve 26 is constituted by the metal mentioned above, it is possible to form the outer sleeve in accordance with a cutting work or a casting. An annular concave portion 26c depressed to an inner side in a radial direction is formed in an intermediate portion in an axial direction of the outer sleeve 26.

The motor stator 24 is constituted by a hollow cylindrical iron core 30, a lead wire 31 wound around the iron core 30, and a holding body 32 covering the lead wire 31 and closely attached to the outer sleeve 26. A plurality of fins are provided in an inner peripheral portion of the iron core 30 so as to be spaced in a peripheral direction in such a manner as to protrude to an inner side and extend in an axial direction. The lead wire 31 is wound around the fin 30a. The holding body 32 is made of a synthetic resin.

The stator assembly 29 having the structure mentioned above can be manufactured in accordance with the following method.

The iron core 30 is shrink fitted to an inner peripheral portion of a portion in which the annular concave portion 26c is formed in the outer sleeve 26. Next, the lead wire 31 is wound around the fin 30a of the iron core 30. Next, both end portions of the lead wire 31 protruding from the iron core 30 are bent to an outer side in a radial direction so as to be formed in a U-shaped cross section, for example, by using a press apparatus or the like. Next, a molten mold resin is poured in a mold metal mold so as to be solidified, and the holding body 32 having the U-shaped cross section as shown in FIG. 6 is formed.

In the stator assembly 29 having the structure mentioned above, since the holding body 32 is formed in accordance with the mold forming, a close contact performance between the motor stator 24 and the outer sleeve 26 is extremely high. Accordingly, since it is possible to make a thermal resistance in a boundary portion between the motor stator 24 and the outer sleeve 26 extremely small, it is possible to efficiently cool the motor stator 24 by the cooling water flowing through the water cooling jacket 26b.

In accordance with the structure of the present invention mentioned above, since the outer sleeve 26 and the motor stator 24 construct the stator assembly 29 as the integral part, and the outer sleeve 26 of the stator assembly 29 and the seal plate 28 are fastened together in the axial direction between the bearing housing 16 and the compressor housing 20, it is possible to simultaneously fix the motor stator 24 to the bearing housing 16 by fixing the compressor housing 20 to the bearing housing 16. Accordingly, since the additional casing and the exclusive fixing part (the fastening device such as the bolt or the like) are not necessary for fixing the motor stator 24 to the bearing housing 16, and it is possible to reduce the number of the parts at a time of assembling, it is easy to assemble and disassemble.

Further, since the outer sleeve 26 is closely attached to the outer peripheral surface of the motor stator 24 and supports the motor stator 24 so as to constrain the rotation of the motor stator 24, it is possible to firmly fix the stator (the motor stator 24) of the electric motor to the bearing housing 16.

Further, since the stator assembly 29 constructs the liquid tight water cooling jacket 26b between the stator assembly 29 and the bearing housing 16, the outer wall portion (the outer sleeve 26) of the stator assembly 29 is directly cooled, whereby it is possible to efficiently cool the motor stator 24 closely attached to the outer sleeve 26.

Further, since the seal plate 28 comparts between the compressor housing 20 and the motor stator 24, and is closely attached to the compressor side of the outer sleeve 26, it is possible to set the contact area therebetween sufficiently wide, and it is possible to efficiently cool the seal plate 28 heated by the compressed air on the basis of the heat transfer from the seal plate 28 to the water cooling jacket 26b.

Figure 7:
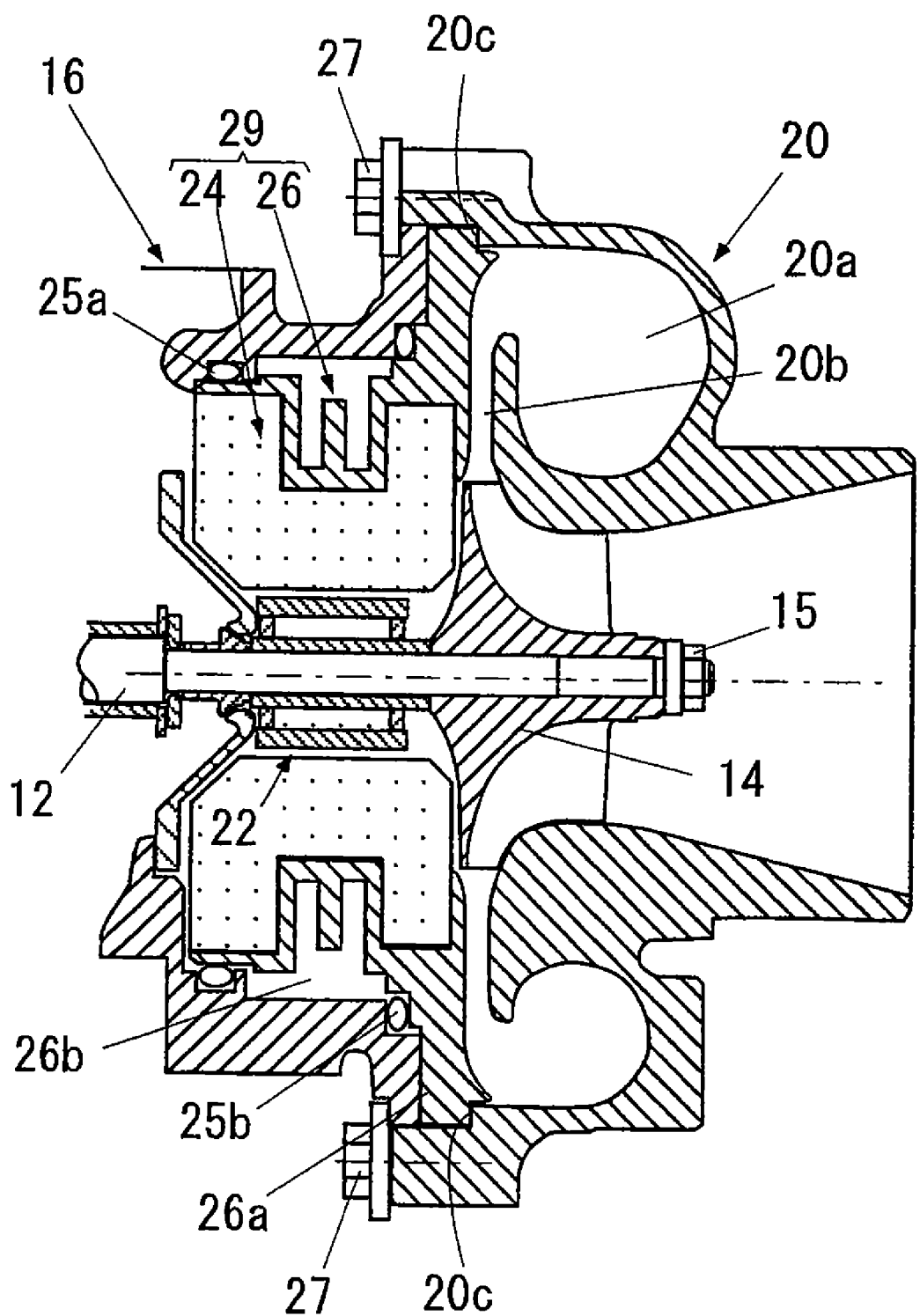
FIG. 7 is a view showing a feature part of a motor-driven supercharger in accordance with a second embodiment of the present invention.

FIG. 7 is a view showing a feature portion of a motor-driven supercharger in accordance with a second embodiment of the present invention. In the following description of the present embodiment, portions to which particular reference is not made are the same as the structures in accordance with the first embodiment.

The outer sleeve 26 in accordance with the present embodiment is structured by integrally forming the outer sleeve 26 and the seal plate 28 in accordance with the first embodiment.

Accordingly, the outer sleeve 26 is fastened together in the axial direction between the bearing housing 16 and the compressor housing 20. Further, in the outer sleeve 26, the wall surface in the compressor side forms a passage (the flow path 20b) of the compressor discharge air.

In accordance with the present embodiment, since it is possible to reduce the number of the parts at a degree at which the seal plate 28 is omitted, it is possible to further easily assemble and disassemble. In addition, it is possible to obtain the same effects as those of the first embodiment.

Figure 8:
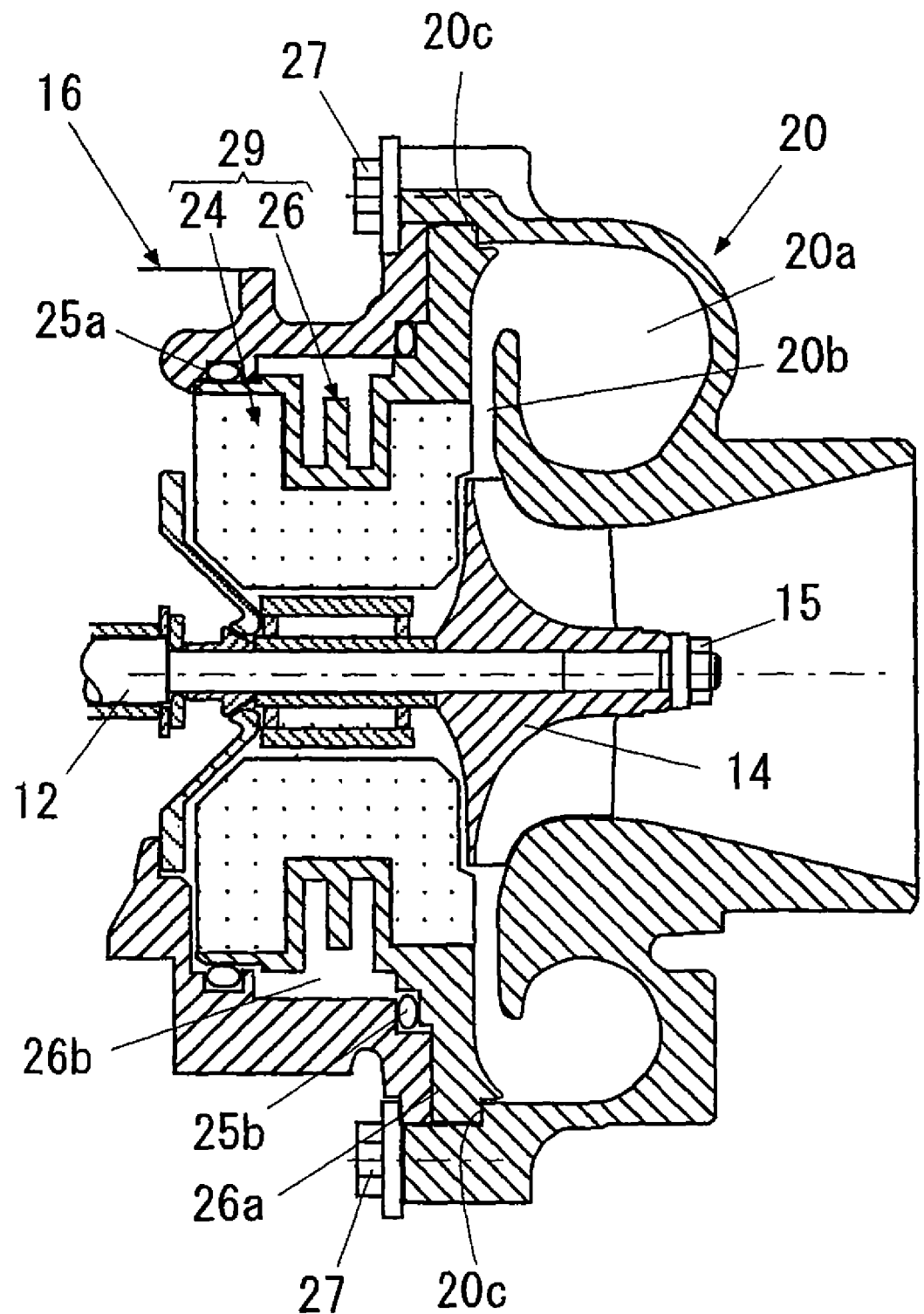
FIG. 8 is a view showing a feature part of a motor-driven supercharger in accordance with a third embodiment of the present invention.

FIG. 8 is a view showing a feature portion of a motor-driven supercharger in accordance with a third embodiment of the present invention. In the following description of the present embodiment, portions to which particular reference is not made are the same as the structures in accordance with the first embodiment.

The outer sleeve 26 in accordance with the present embodiment is structured by integrally forming the outer sleeve 26 and the seal plate 28 (only a portion corresponding to the outer sleeve 26) in accordance with the first embodiment, and integrally forming the motor stator 24 and the seal plate 28 (only a portion corresponding to the motor stator 24).

Accordingly, the outer sleeve 26 is fastened together in the axial direction between the bearing housing 16 and the compressor housing 20. Further, the wall surface in the compressor side of the outer sleeve 26 and the wall surface in the compressor side of the motor stator 24 form a passage (the flow path 20b) of the compressor discharge air.

In accordance with the present embodiment, since it is possible to reduce the number of the parts at a degree at which the seal plate 28 is omitted, it is possible to further easily assemble and disassemble. In addition, it is possible to obtain the same effects as those of the first embodiment.

In this case, it goes without saying that the present invention is not limited to the embodiments mentioned above, but can be variously modified within a range which does not deviate from the scope of the present invention.

What is claimed is:

1. A motor-driven supercharger comprising:
   (a) a turbine shaft having a turbine impeller in one end;
   (b) a compressor impeller rotationally driven by the turbine shaft;
   (c) a bearing housing rotatably supporting the turbine shaft;
   (d) a compressor housing rotatably surrounding the compressor impeller and coupled to the bearing housing;
   (e) a motor stator fixed within the bearing housing;
   (f) a motor rotor rotationally driven by the motor stator;
   (g) a stator assembly inserted and attached to the bearing housing; and
   (h) a seal plate closely attached to a compressor side of the stator assembly and comparting between the compressor housing and the motor stator,
   wherein the stator assembly includes
      i. the motor stator; and
      ii. an outer sleeve having an inner peripheral surface closely attached to an outer peripheral surface of the motor stator and the outer sleeve supports the motor stator in order to constrain a rotation of the motor stator, wherein the motor stator and the outer sleeve form an integral part, and an intermediate portion of the outer sleeve defines a liquid tight water cooling jacket between the outer sleeve and the bearing housing, and wherein the outer sleeve and the seal plate are fastened together in an axial direction between the bearing housing and the compressor housing.

2. A motor-driven supercharger as claimed in claim 1, wherein the outer sleeve has a flange portion fastened together with the seal plate and extending to an outer side in a radial direction between the bearing housing and the compressor housing.

3. A motor-driven supercharger as claimed in claim 1, wherein the motor-driven supercharger has two seal members disposed to provide a seal, in a liquid tight manner, between the bearing housing and the outer sleeve and arranged so as to be spaced in an axial direction from each other.

4. A motor-driven supercharger as claimed in claim 1, wherein the intermediate portion of the outer sleeve includes an annular concave portion depressed to an inner side in a radial direction.

5. A motor-driven supercharger as claimed in claim 1, wherein the motor stator comprises
   i. a hollow cylindrical iron core;
   ii. a wire wound around the iron core;
   iii. a holding body covering the wire and attached to the outer sleeve,
   wherein the iron core is fitted to an inner peripheral portion of the intermediate portion of the outer sleeve in which the annular concave portion is formed so that the annular concave portion is disposed in a portion of the iron core.

6. A motor-driven supercharger as claimed in claim 1, wherein the liquid tight water cooling jacket is disposed so as to permit heat transfer from both the motor stator and the seal plate that are attached to the outer sleeve to the liquid tight water cooling jacket.

7. A motor-driven supercharger comprising:
   (a) a turbine shaft having a turbine impeller in one end;
   (b) a compressor impeller rotationally driven by the turbine shaft;
   (c) a bearing housing rotatably supporting the turbine shaft;
   (d) a compressor housing rotatably surrounding the compressor impeller and coupled to the bearing housing;
   (e) a motor stator fixed within the bearing housing;
   (f) a motor rotor rotationally driven by the motor stator;
   (g) a stator assembly inserted and attached to the bearing housing, wherein the stator assembly includes
      i. the motor stator; and
      ii. an outer sleeve having an inner peripheral surface closely attached to an outer peripheral surface of the motor stator, and the outer sleeve supports the motor stator in order to constrain a rotation of the motor stator, wherein the motor stator and the outer sleeve form an integral part, and a wall surface in the compressor side in the stator assembly forms a passage of a compressor discharge air, and
   wherein the outer sleeve is fastened in an axial direction between the bearing housing and the compressor housing, and an intermediate portion of the outer sleeve defines a liquid tight water cooling jacket between the outer sleeve and the bearing housing.

8. A motor-driven supercharger as claimed in claim 7, wherein the outer sleeve has a flange portion fastened together and extending to an outer side in a radial direction between the bearing housing and the compressor housing.

9. A motor-driven supercharger as claimed in claim 7, wherein the motor-driven supercharger has two seal members disposed to provide a seal, in a liquid tight manner, between the bearing housing and the outer sleeve and arranged so as to be spaced in an axial direction from each other.

10. A motor-driven supercharger as claimed in claim 7, wherein the intermediate portion of the outer sleeve includes an annular concave portion depressed to an inner side in a radial direction.

11. A motor-driven supercharger as claimed in claim 7, wherein the motor stator comprises
   i. a hollow cylindrical iron core;
   ii. a wire wound around the iron core;
   iii. a holding body covering the wire and attached to the outer sleeve,
   wherein the iron core is fitted to an inner peripheral portion of the intermediate portion of the outer sleeve in which the annular concave portion is formed so that the annular concave portion is disposed in a portion of the iron core.

* * * * *